United States Patent
Chuh et al.

(10) Patent No.: US 11,123,677 B2
(45) Date of Patent: Sep. 21, 2021

(54) INTEGRATED VORTEX SEPARATOR

(71) Applicant: B/E Aerospace, Inc., Winston Salem, NC (US)

(72) Inventors: Yen Chuh, Irvine, CA (US); Thao Hoang, Arlington, WA (US); Kristin R. Noriega, Snohomish, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 118 days.

(21) Appl. No.: 16/280,623

(22) Filed: Feb. 20, 2019

(65) Prior Publication Data
US 2020/0261840 A1 Aug. 20, 2020

(51) Int. Cl.
*B01D 50/00* (2006.01)
*B01D 45/16* (2006.01)
*B01D 46/00* (2006.01)
*B01D 46/24* (2006.01)
*B01D 46/42* (2006.01)
(Continued)

(52) U.S. Cl.
CPC ........... *B01D 50/002* (2013.01); *B01D 45/16* (2013.01); *B01D 46/003* (2013.01); *B01D 46/2411* (2013.01); *B01D 46/4272* (2013.01); *B64D 11/02* (2013.01); *E03D 3/10* (2013.01)

(58) Field of Classification Search
CPC .... B01D 50/002; B01D 45/16; B01D 46/003; B01D 46/2411; B01D 46/4272; B64D 11/02; E03D 3/10; B04C 9/00; B04C 5/04; B04C 5/15; B04C 5/26; B04C 2009/004; B04C 2005/136; B04C 5/13
See application file for complete search history.

(56) References Cited

U.S. PATENT DOCUMENTS 2,113,586 A * 4/1938 Holt .................... B07B 7/08
                                                       209/139.2
6,453,481 B1   9/2002 Pondelick et al.
(Continued)

FOREIGN PATENT DOCUMENTS

| EP | 2471429 A2 | 7/2012 |
| EP | 2767345 A2 * | 8/2014 ............. B01D 45/12 |
| EP | 2767345 A2 | 8/2014 |

OTHER PUBLICATIONS

Extended EP Search Report dated Jun. 5, 2020 for EP Application No. 19212875.

*Primary Examiner* — Dung H Bui
(74) *Attorney, Agent, or Firm* — Suiter Swantz pc llo

(57) ABSTRACT

An integrated vortex separator (IVS) is disclosed. The IVS includes a housing in communication with a waste inlet via which a waste stream is drawn under suction into a waste tank. In a first stage, the waste stream is drawn into a centrifugal vortex flow to facilitate the removal of solid and liquid waste from the waste stream, leaving a primary airstream. Within the housing, a filter assembly includes outer and inner inverted cones with a conical cavity therebetween, the cavity serving as a second stage into which the vortex flow is redirected to remove additional liquid from the airstream. Radial vanes extending inward from the outer cone define portals between adjacent vanes, through which the redirected vortex flow is isolated from the original vortex flow. Exhaust ports in communication with the conical cavity allow the substantially moisture-free airstream to be drawn from the IVS via a vent line.

13 Claims, 9 Drawing Sheets

(51) Int. Cl.
    *B64D 11/02*     (2006.01)
    *E03D 3/10*     (2006.01)

(56) References Cited

U.S. PATENT DOCUMENTS

| | | |
|---|---|---|
| 6,468,426 B1 | 10/2002 | Klass |
| 7,998,250 B2 | 8/2011 | Pondelick et al. |
| 7,998,251 B2 | 8/2011 | Pondelick et al. |
| 8,291,525 B2 | 10/2012 | Pondelick et al. |
| 8,607,370 B2 | 12/2013 | Hoang et al. |
| 2009/0300872 A1* | 12/2009 | Griffith ................ A47L 9/1608 15/347 |
| 2010/0083832 A1* | 4/2010 | Pondelick ................ B04C 9/00 95/261 |
| 2018/0213985 A1* | 8/2018 | Song .................... A47L 9/1683 |

\* cited by examiner

INTEGRATED VORTEX SEPARATOR

CROSS-REFERENCE TO RELATED APPLICATIONS

This application relates to the following applications concurrently filed herewith and each incorporated herein in its entirety by these references: U.S. patent application Ser. No. 16/280,761 entitled BYPASS FLOW REGULATOR; and U.S. patent application Ser. No. 16/280,700 entitled INLINE VORTEX DEMISTER.

BACKGROUND

A vacuum waste system aboard an aircraft collects solid and liquid waste from toilets and other receptacles (e.g., lavatories disposed throughout the aircraft cabin) via piping connecting the toilet bowl or receptacle to a waste tank. Waste products can be transported from the bowl or receptacle through the piping and into the tank for storage by pumping air from the waste tank to induce suction. For sanitary reasons, it is clearly preferable for an airstream pumped from the waste tank not to contain any solid waste particles, as the airstream may be expelled either elsewhere aboard the aircraft or into the surrounding atmosphere. Similarly, the airstream should be free of moisture, as any moisture carried by an airstream expelled from the aircraft may condense or freeze, obstructing the vent line.

SUMMARY

An integrated vortex separator (IVS) is disclosed. In embodiments, the IVS includes an outer housing in communication with a waste inlet via which a waste stream (e.g., from a toilet bowl or receptacle within the aircraft cabin) is drawn under suction into a waste tank of the IVS. In a first stage of the IVS, the waste stream is drawn into a centrifugal vortex flow around the outer housing to facilitate the removal of solid and liquid waste from the waste stream, leaving a primary airstream. Within the housing of the IVS, a filter assembly includes outer and inner inverted conical structures with a conical gap or cavity therebetween, the conical cavity serving as a second stage into which the centrifugal vortex flow is redirected to remove additional liquid components from the primary airstream, resulting in a secondary airstream. A series of radial vanes extending inward from the outer cone define portals between adjacent vanes, through which the redirected vortex flow is isolated from the original vortex flow, and upon which the additional moisture may be trapped and allowed to drop out of the IVS. Exhaust ports in communication with the conical cavity allow the substantially moisture-free secondary airstream to be drawn out of the IVS via a vent line.

In some embodiments, the centrifugal vortex flow is around the inner surface of the outer housing in a first annular direction, e.g., clockwise or counterclockwise, while the redirected vortex flow is around the conical cavity in an opposing annular direction.

In some embodiments, the IVS includes a third stage within the inner cone; from the third stage the substantially moisture-free airstream enters the exhaust port and is removed from the IVS. The third stage includes additional filtering media within the inner cone for removing any remaining moisture or waste components from the secondary airstream.

In some embodiments, the filtering media includes a removable or replaceable filter cartridge.

In some embodiments, the filtering media include demisting filters situated atop the third stage and adjacent to the exhaust port.

In some embodiments, the secondary airstream is directed into the third stage from the second stage via air scoops or ports situated near the top of the inner inverted cone.

In some embodiments, the third stage includes a check valve situated below the filtering media at the bottom of the inner cone, wherein the collected moisture may drop from the third stage and out of the IVS when the IVS is not under suction.

In some embodiments, the radial vanes are set at angles of at most 45 degrees to vertical.

In some embodiments, the radial vanes are coated in a hydrophobic material.

In some embodiments, the exhaust port is disposed within a removable exhaust cap attached to the IVS housing.

In some embodiments, the IVS is mounted to an aircraft-based waste tank which receives waste streams from toilet bowls or receptacles within the aircraft cabin; recovered liquid and solid waste components may drop from the IVS into the waste tank.

In some embodiments, the IVS is mounted to the waste tank in a non-vertical or orthogonal orientation to reduce the overall height of the VWS.

A multi-stage diverter/demister system is also disclosed. In embodiments, the diverter/demister system includes an IVS (e.g., diverter) as described above and a demister assembly in communication with the IVS. The secondary airstream from which solid and liquid components have been removed by the diverter is drawn by suction into an outer chamber of the demister and redirected into a vortex flow by angled radial vanes extending inward from the inner surface of the outer chamber. The demister includes an inner chamber within the outer chamber which receives the vortex flow therefrom through air scoops or ports connecting the outer and inner chambers. The inner chamber includes additional filtering media which remove moisture from the vortex flow resulting in a substantially moisture-free airstream which is removed from the demister and expelled from the system via an exhaust port in communication with a vent line.

In some embodiments, the diverter/demister system is mounted to an aircraft-based waste tank of a vacuum waste system (VWS), the waste tank capable of receiving multiple waste streams under suction (e.g., from toilet bowls or receptacles aboard the aircraft) via multiple waste inlets in communication with the diverter.

In some embodiments, the demister includes a check valve beneath the inner chamber, capable of opening to allow accumulated moisture to drop into the waste tank when the VWS is not under suction.

In some embodiments, the VWS includes a vent line leading from the exhaust port, the vent line capable of removing the substantially moisture-free airstream from the aircraft under suction when the aircraft is at sufficient altitude for the VWS to induce suction via the pressure differential between the aircraft cabin pressure and the atmospheric pressure external to the aircraft. The VWS further includes a vacuum generator in communication with the vent line, the vacuum generator capable of inducing suction within the VWS at lower altitudes where the external air pressure is not sufficiently low. A check valve or flow regulator may selectably connect the waste tank to the vacuum generator and the external vent line.

In some embodiments, the diverter includes a third stage within its inner cone, from which third stage the reduced-moisture airstream may be further filtered before being drawn into the demister. The third stage includes additional filtering media within the inner cone for removing any additional moisture or waste components from the secondary airstream.

In some embodiments, the inner cone includes air scoops or ports through which the reduced-moisture airstream may be drawn from the second stage into the third stage.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
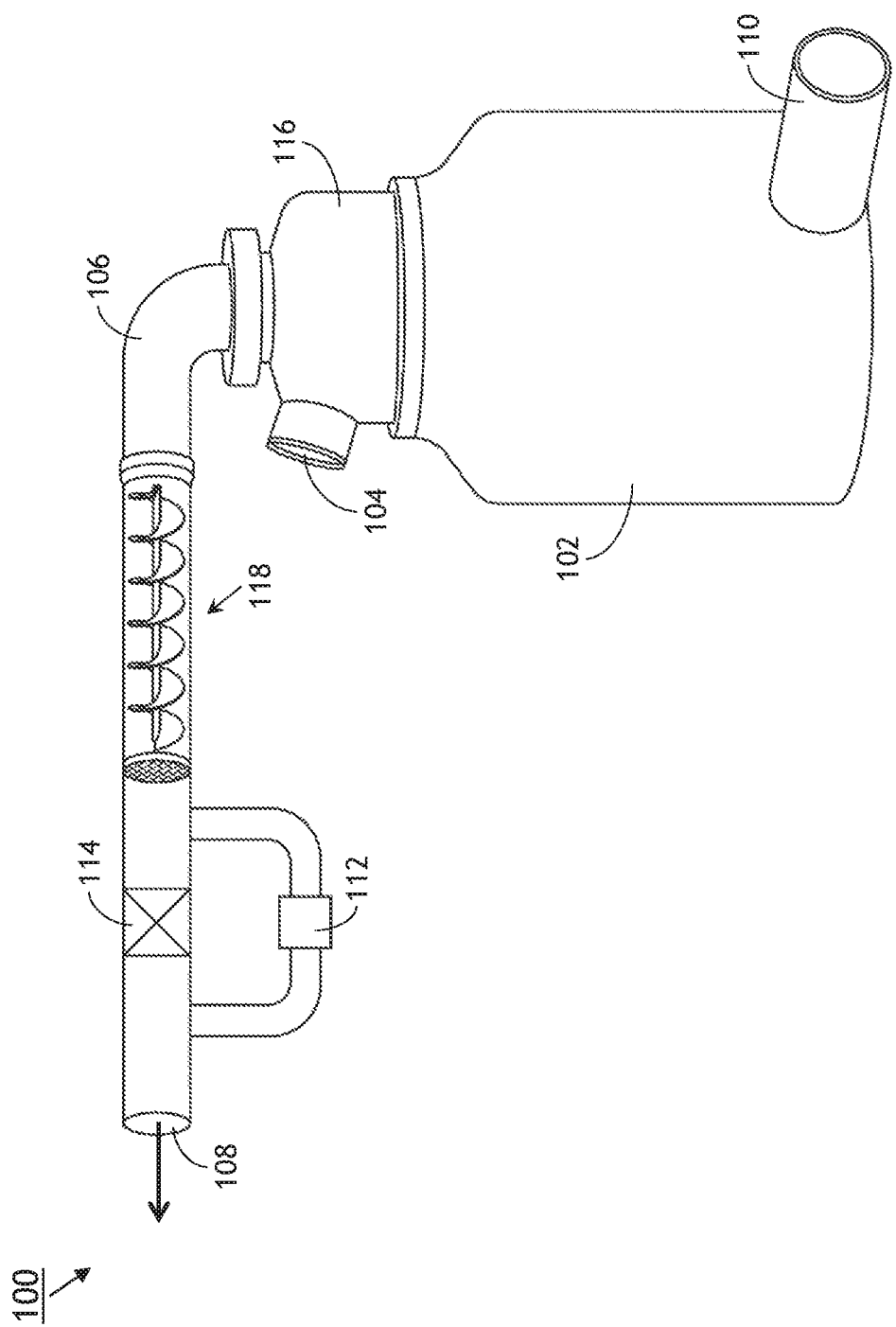
FIG. 1 is a diagrammatic illustration of a vacuum waste system (VWS) in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An integrated vortex separator mountable to a waste tank of an aircraft-based vacuum waste system is disclosed. The integrated vortex separator allows for more efficient active separation of solid and liquid waste components from a waste stream by incorporating radial vanes to perform additional work on the saturated air flow forced through the separator during a flush sequence. The radial vanes function as a stationary turbine for reversing the vector of the airflow, directing it in a vortex that allows entrained and suspended water droplets to drop out of the flow and into a waste tank with minimal pressure drop.

Referring to FIG. 1, a portion of a vacuum waste system 100 (VWS) is shown. The VWS 100 may collect solid and liquid waste products from toilets and other receptacles (e.g., installed in lavatories) aboard an aircraft, storing the waste products in a waste tank 102. The waste tank 102 may be connected to one or more toilet bowls or waste receptacles by piping connected to a waste inlet 104. For example, when the toilet is flushed, the VWS 100 may induce negative pressure within the waste tank 104 by pumping air out of the waste tank through a vent line 106 or air outlet. The waste inlet 104 may be angled downward, relative to the horizontal, so that gravity may assist the suction of waste into the waste tank 102 via the waste inlet. The vent line 106 may expel the airstream from the aircraft, and into the surrounding atmosphere, via an external outlet 108. The resulting pressure differential between the interior of the waste tank 102 (e.g., at reduced pressure) and the aircraft cabin (e.g., at normal pressure) induces suction, propelling the waste stream through the piping and into the waste tank 102, where it may be stored for later removal (e.g., after landing) via a drain outlet 110.

While the aircraft is on the ground or at lower altitudes (e.g., below 16,000 feet), a vacuum generator 112 connected to the vent line 106 may operate during flush sequences to generate the necessary pressure differential and induce suction. Above this altitude, suction may be induced by the pressure differential between the interior cabin pressure and atmospheric pressure external to the aircraft (as the surrounding air is sufficiently thin at higher altitudes). A bypass check valve 114 may be activated (e.g., by an onboard control system when the aircraft reaches sufficient altitude) to switch control of the vent line 106 from the vacuum generator 112 to the external outlet 108. The vent line 106 may include a bypass flow regulator (not shown) in place of the bypass check valve 114. For example, as the aircraft gains altitude, the surrounding atmosphere becomes thinner and the pressure differential with the cabin interior greater. The bypass flow regulator may incorporate adjustable valves in the vent line 106 which restrict the flow rate of the airstream during flush sequences so that the capacity of the VWS 100 to remove solid and liquid waste components from the airstream before the airstream enters the vent line is not exceeded by the flow rate.

The VWS 100 may include a vortex separator 116 (e.g., diverter) in communication with the waste inlet 104 and mounted to the waste tank 102. During flush sequences, as the waste stream enters the waste tank 102 and air is removed from the waste tank, the vortex separator 116 may act on the incoming waste stream in multiple stages to remove solid and liquid waste components from the airstream before the airstream enters the vent line 106. The resulting solid and liquid waste components may drop or condense into the waste tank 102. In some embodiments, the VWS 100 may incorporate a two-stage separator/demister apparatus for removing solid and liquid components from the waste stream; alternatively or additionally, the VWS may incorporate an additional demister 118 in the vent line 106 to remove moisture from the airstream after it is drawn out of the waste tank 102.

Referring to FIGS. 2A through 2D, the integrated vortex separator 116a (IVS) may be implemented and may function similarly to the vortex separator 116 of FIG. 1, except that the IVS 116a may incorporate a first stage between the housing 202 of the IVS and an outer nested cone 204 disposed therein; a second stage between the outer nested cone 204 and an inner nested cone 206 disposed therein, and corresponding to a conical cavity 208 between the outer and inner nested cones; a plurality of radial vanes 210 extending inward from an inner surface of the outer nested cone 204; a third stage (212) within the inner nested cone 206 and including knitted mesh filters 214 or similarly appropriate filtering media; a removable exhaust cap 216 atop the housing 202 and including an exhaust tube 218 (e.g., exhaust port) in communication with the vent line 106; and disc screen filters 220 or similarly appropriate filtering media disposed atop the third stage and proximate to the exhaust cap 216.

Figure 2A:
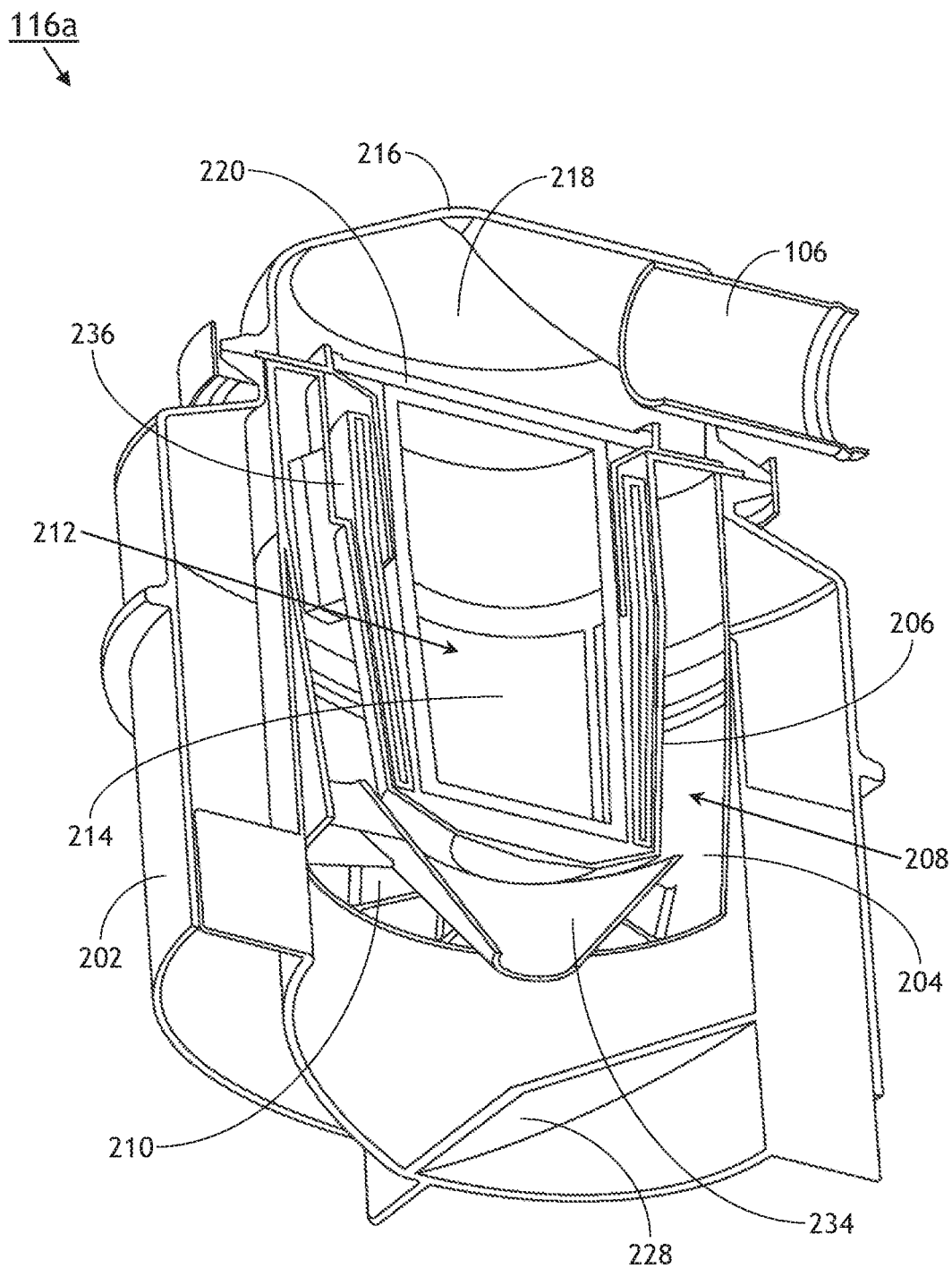
FIG. 2A is a partial cutaway view.
Figure 2B:
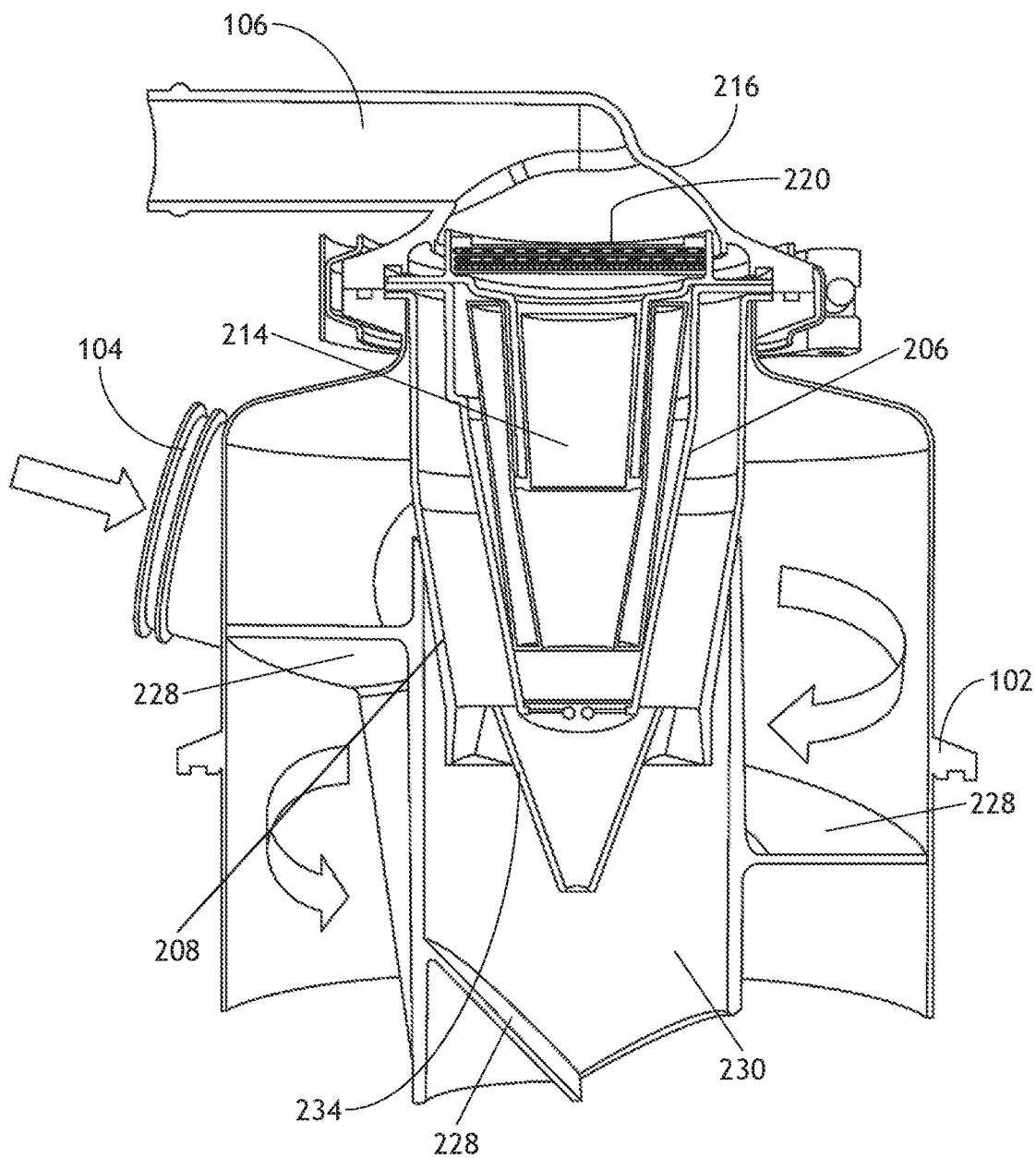
FIGS. 2B and 2C are cross sectional views.
Figure 2C:
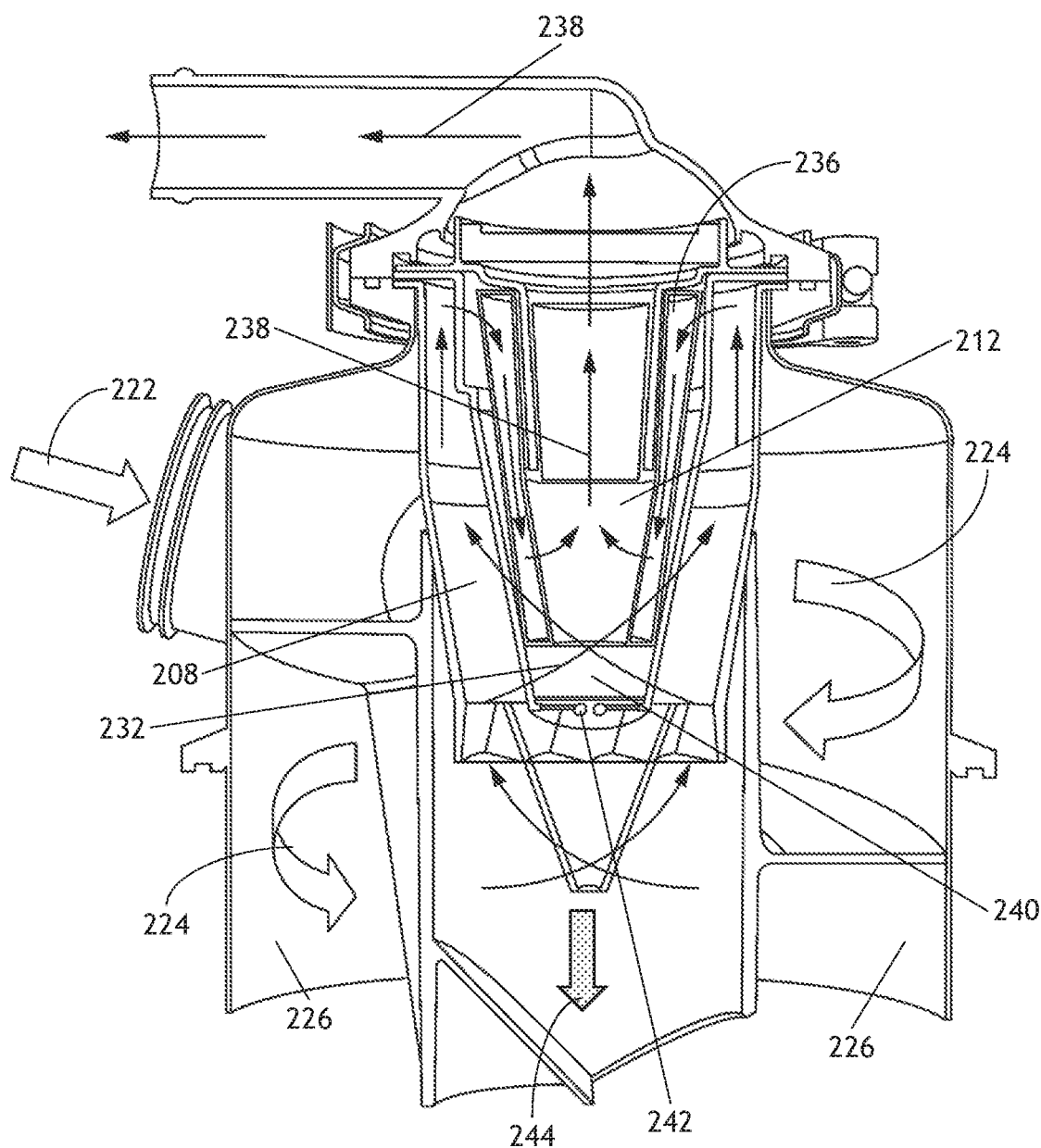

Referring generally to FIGS. 2A through 2C, the housing 202 may be substantially cylindrical and mounted in a vertical orientation atop the waste tank (102, FIG. 1). In some embodiments, the IVS 116a may be mounted to the waste tank 102 in a non-vertical orientation (e.g., diagonal, orthogonal) to conserve height. On initiation of a flush sequence, an airstream may be expelled from the waste tank 102 via the vent line 106 while a waste stream 222 is drawn into the waste tank (via the waste inlet 104) by the resulting suction. The housing 202 may direct the airflow through the waste tank 102 into a primary annular vortex flow (224) around the inner surface 226 of the housing, assisted by helical separators 228 extending from the inner surface 226 to the inner surface 230 of the integrated vortex separator 116a. The primary annular vortex flow 224 may serve as a first stage airstream, removing solid and liquid waste components from the waste stream 222 via centrifugal force and depositing the separated waste components along the inner surface 226 where they may be directed downward into the waste tank 102 and away from the airflow into the IVS 116a.

The outer nested cone 204 and inner nested cone 206 may generally be inverted conical structures, the conical cavity 208 therebetween (also an inverted cone) defining a second stage of the IVS 116a. For example, the primary annular vortex flow 224 may be directed from the first stage into the conical cavity 208 where the radial vanes 210 function as a stationary turbine, redirecting and slowing the primary annular vortex flow 224 into a secondary annular vortex flow 232 isolated from, and reversed in vector from, the primary annular vortex flow. The radial vanes 210 may direct the secondary annular vortex flow 232 into the outer surface of the inner nested cone 206 (e.g., the inner surface of the conical cavity 208), enabling entrained and suspended water droplets still within the secondary annular vortex flow to collect on the outer surface of the inner nested cone, where they may drain back into the waste tank 102 with minimal pressure drop. The outer nested cone 204 may incorporate a funnel structure 234 to coalesce suspended water droplets collected on the inner nested cone 206; the funnel structure may be open at the bottom for the droplets to drain after the flush sequence has concluded and minimal pressure drop is restored to the waste tank 102.

The secondary annular vortex flow 232 may be drawn upward through the conical cavity 208 in substantially helical fashion before reaching air scoops 236 (e.g., ports) near the top of the conical cavity. The air scoops 236 may draw the secondary annular vortex flow 232 within the inner nested cone 206 and into the third stage 212, where the (reduced-moisture) final-stage airstream (238) is drawn through tortuous airways defined by knitted mesh filters 214 which trap any remaining moisture before the airstream is drawn upward through the exhaust port 218. Further filtering of the airstream may be achieved by disc screen filters 220 mounted atop the inner nested cone 206 and directly adjacent to the exhaust port 218. Any moisture removed from the final-stage airstream 238 within the third stage 212 may condense within, and drain toward the bottom of, the inner nested cone 206. The collection area 240 at the bottom of the inner nested cone 206, where condensed moisture from within the third stage 212 may collect, may include a check valve 242 capable of opening after the flush sequence, when minimal pressure drop is restored to the waste tank 102, and releasing the condensed moisture back into the waste tank (244).

Figure 2D:
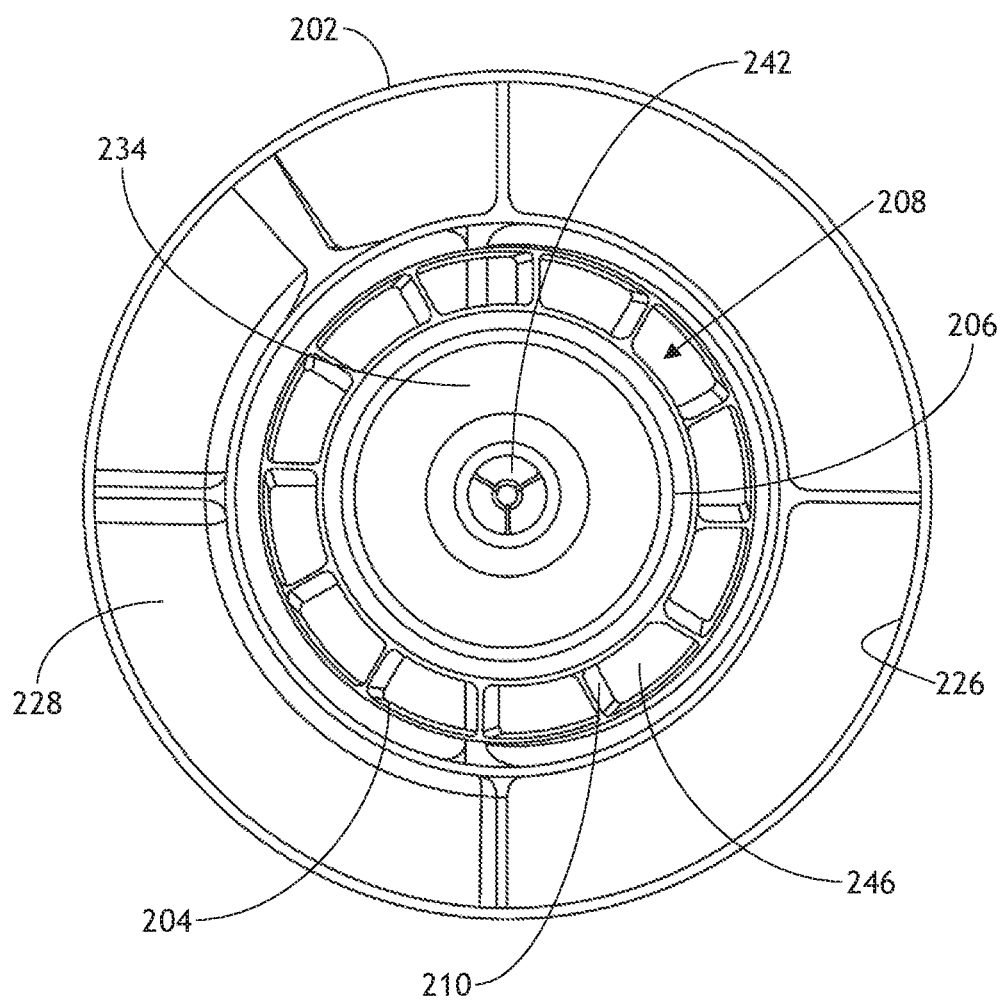
FIG. 2D is a dorsal view of an integrated vortex separator (IVS) of the VWS of FIG. 1.

Referring in particular to FIG. 2D, an underside view of the IVS 116a is shown. The radial vanes 210 may extend inward from the inner surface of the outer nested cone 204 in a spaced apart relationship, defining a plurality of portals 246 between each pair of adjacent radial vanes. Each radial vane 210 may be angled up to 45 degrees from true vertical in order to redirect the primary annular vortex flow 224 into the conical cavity 208 in a reverse helical fashion.

Figure 3:
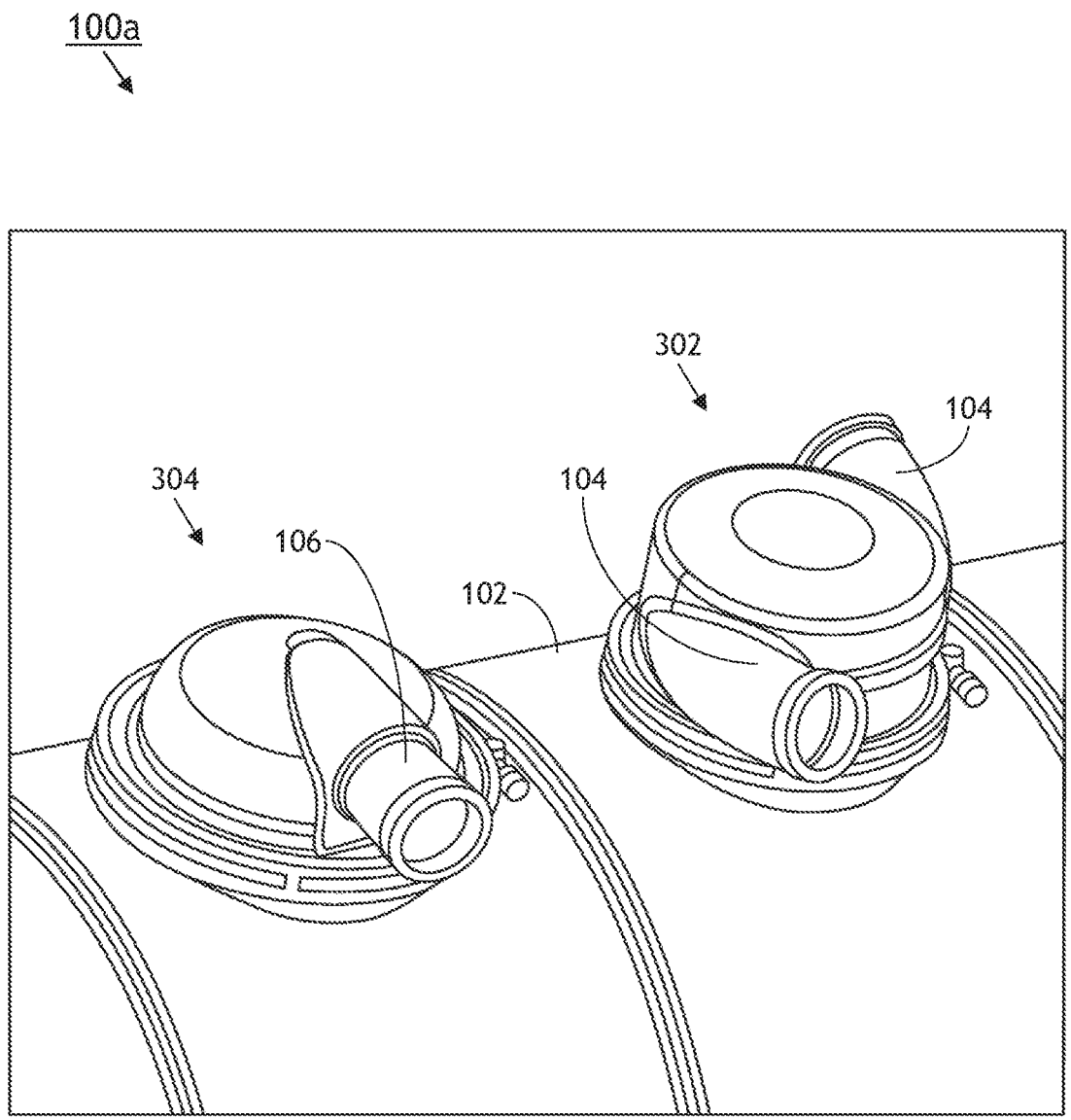
FIG. 3 is a partial isometric view of a VWS in accordance with example embodiments of this disclosure.

Referring now to FIG. 3, the VWS 100a may be implemented and may function similarly to the VWS 100 of FIG. 1, except that the VWS 100a may partially or fully separate the functionality of the IVS (116a, FIGS. 2A-D) into a diverter assembly 302 and a demister assembly 304. For example, the diverter assembly 302 may be mounted to the waste tank 102 adjacent to, and in communication with, one or more waste inlets 104 to remove solid and liquid waste components from waste streams (222, FIG. 2B) entering the waste tank thereby. Similarly, the demister assembly 304 may be mounted to the waste tank 102 directly adjacent to the vent line 106 to remove any remaining moisture from the final-stage airstream (238, FIG. 2C) before the airstream leaves the waste tank via the vent line.

Figure 4:
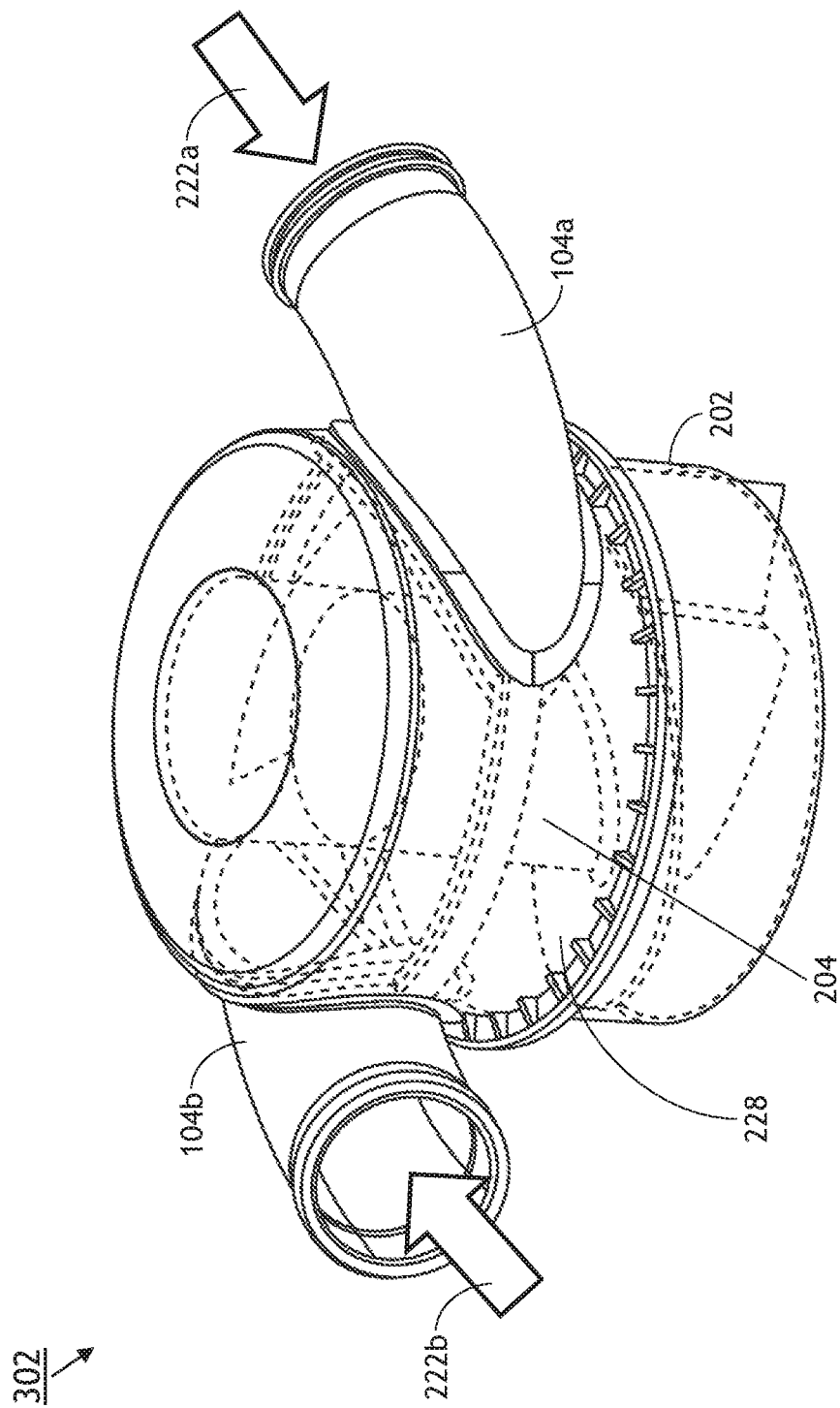
FIG. 4 is an exterior view of a diverter assembly of the VWS of FIG. 3.

Referring now to FIG. 4, the diverter assembly 302 may be implemented and may function similarly to the IVS 116a of FIGS. 2A through 2D, except that the diverter assembly 302 may incorporate, instead of a vent line (106, FIG. 3) drawing air from the waste tank (102, FIG. 3), multiple waste inlets 104a-b. The diverter assembly 302 may incorporate two or more waste inlets 104a-b, each waste inlet capable of drawing a separate waste stream 222a-b into the diverter. The waste inlets 104a-b may be incorporated into a removable cap 402, similarly to the exhaust cap (216, FIG. 2A) but without a vent line (106, FIG. 3) or other airstream outlet. Once the waste streams 222a-b are drawn into the diverter (e.g., either the waste stream 222a or the 222b may be independently drawn into the waste tank 102 by initiation of a flush sequence, or the two waste streams may be drawn in at the same time by simultaneous or contemporaneous flush sequences), the diverter assembly 302 may remove solid and liquid waste components from the waste streams 222a-b similarly to the IVS 116a, e.g., via a first stage around the outer housing 202 of the diverter assembly 302 (assisted by helical separators 228) and second/third stages within the outer inverted cone 204 of the diverter assembly. However, rather than being drawn upward through the diverter assembly 302 and through an exhaust port (218, FIG. 2A) to a vent line (106, FIG. 2A), the reduced-moisture airstream (238, FIG. 2C) may be drawn by suction into the demister assembly (304, FIG. 3).

Figure 5A:
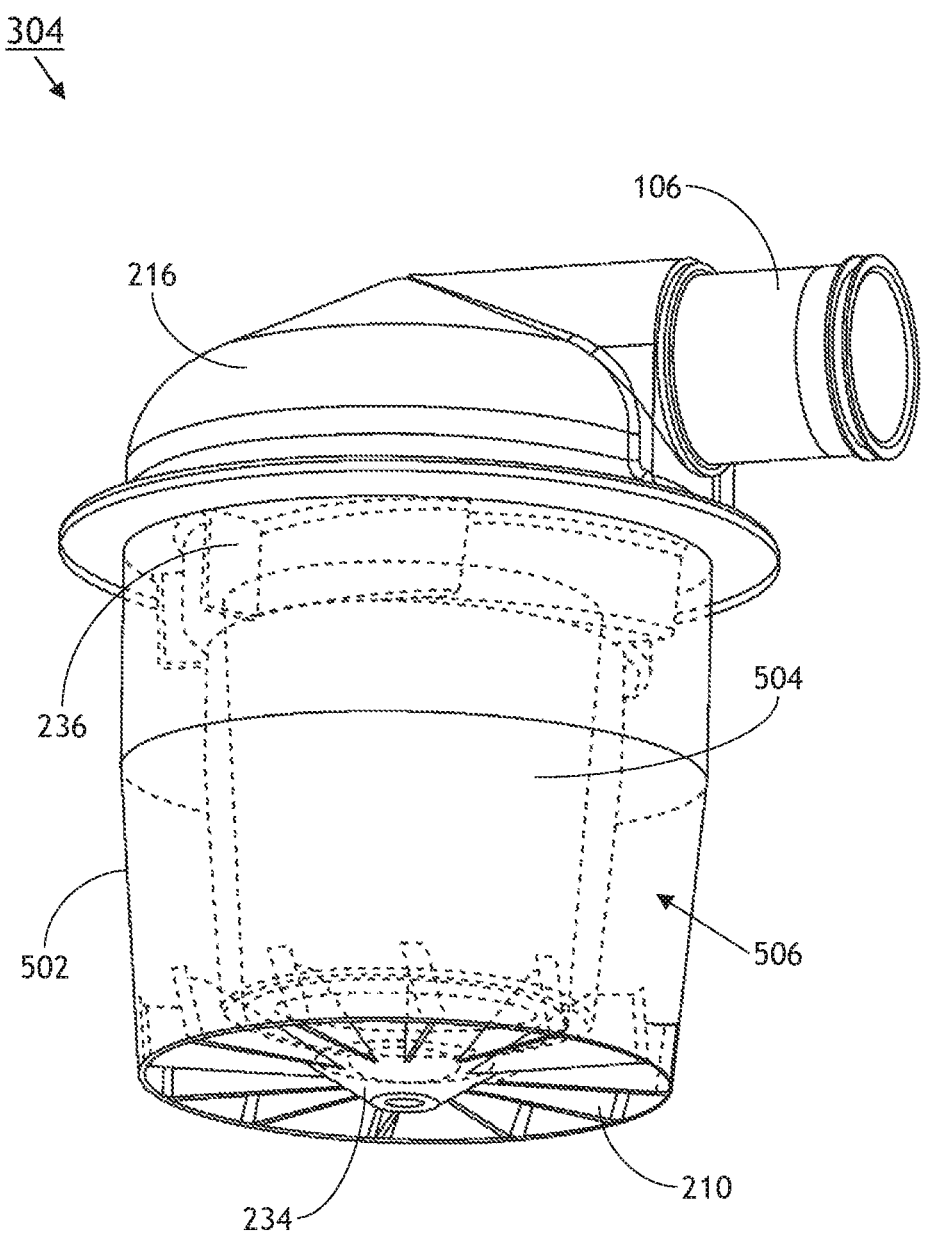
FIG. 5A is an isometric exterior view.
Figure 5B:
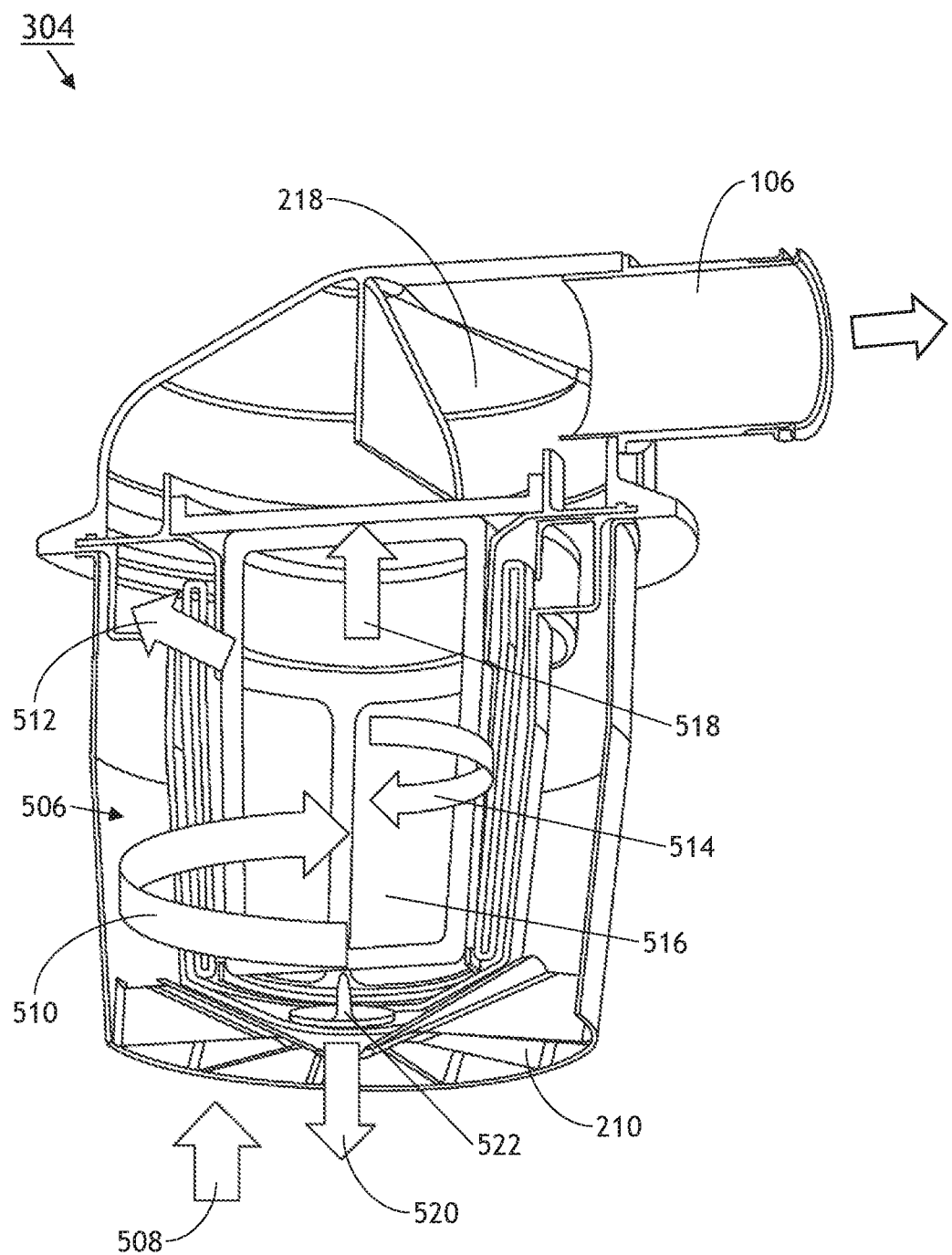
FIG. 5B is a cutaway view, of a demister assembly of the VWS of FIG. 3.

Referring now to FIGS. 5A and 5B, the demister assembly 304 may incorporate an outer cylinder 502, an inner cylinder 504 and a cylindrical gap 506 therebetween. A plurality of radial vanes 210 may extend inward from the inner surface of the outer cylinder 502, the radial vanes angled from the vertical (up to 45 degrees; e.g., between 10 and 15 degrees to vertical) to redirect the airstream (508) drawn into the demister assembly 304 from the diverter assembly (302, FIG. 4), which has already acted on the airstream 508 (and on the waste streams 222a-b (FIG. 4) drawn into the waste tank (102, FIG. 3) by the expulsion of the airstream) to remove solid and liquid waste components. The radial vanes 210 may redirect the airstream 508 into an annular vortex flow 510 around the cylindrical gap 506, allowing additional suspended droplets to collect on the inner surface of the outer cylinder 502 via centrifugal force. Suspended droplets may additionally coalesce on the radial vanes 210; the radial vanes, as well as other interior surfaces of the demister assembly 304, the diverter assembly (302, FIG. 4), or the IVS 116a may be coated in hydrophobic materials to facilitate this process.

The annular vortex flow 510 may be drawn (512) into the inner cylinder 504 through air scoops/ports 236 situated near the top of the cylindrical gap 506. Once within the inner cylinder 504, the airstream may be forced (514) through additional mesh filtering media 516 to remove additional moisture. The substantially moisture-free airstream may be drawn upward (518) through the mesh filtering media 516 into the exhaust port 218 and out of the demister assembly 304 via the vent line 106.

Similarly to the IVS 116a, the demister assembly 304 may include a funnel structure 234 beneath the inner cylinder 504. For example, moisture removed from the airstream within the inner cylinder (e.g., via the mesh filtering media 516) may collect within the funnel structure 234 and fall therefrom (520) back into the waste tank 102. The funnel structure 234 may include an umbrella valve 522 or similar mechanism for allowing collected moisture to exit the funnel structure (e.g., when minimal pressure drop is restored to the VWS 100a) while preventing air from entering the demister assembly 304 thereby.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft waste system, comprising:
   one or more of an aircraft-based toilet or an aircraft-based receptacle;
   a waste tank coupled to the one or more of an aircraft-based toilet or an aircraft-based receptacle by a waste inlet and configured to receive therefrom at least one waste stream via the waste inlet;
   and
   an integrated vortex separator, comprising:
      a housing defining a first stage, the housing in communication with the waste inlet, the first stage associated with a primary vortex flow for removing at least one of a first liquid component and a first solid component from the waste stream to produce a primary airstream, the primary vortex flow associated with a helical vector;
      a filter assembly comprising an outer inverted cone, an inner inverted cone, and a conical cavity therebetween, the conical cavity defining a second stage associated with a secondary vortex flow for removing at least one of a second liquid component and a second solid component from the primary airstream to produce a secondary airstream;
      a plurality of radial vanes extending inward from an inner surface of the outer inverted cone in a spaced apart relationship, the plurality of radial vanes defining a plurality of portals between the first stage and the second stage and configured to slow and redirect the secondary vortex flow against the inner inverted cone by reversing the helical vector of the primary vortex flow;
      and
      at least one exhaust port in communication with the conical cavity, the exhaust port configured to withdraw the secondary airstream from the second stage under suction.

2. The aircraft waste system of claim 1, further comprising:
   a third stage disposed within the inner inverted cone and in communication with the second stage and the exhaust port, the third stage including at least one filter configured to remove at least one of a third liquid component and a third solid component from the secondary airstream.

3. The aircraft waste system of claim 2, wherein the at least one filter includes one or more mesh filters capable of coalescing at least one of the third liquid component and the third solid component.

4. The aircraft waste system of claim 2, wherein the at least one filter includes at least one screen filter defining a top of the third stage and disposed proximate to the exhaust port.

5. The aircraft waste system of claim 2, wherein the third stage is in communication with the second stage via at least one port disposed within the inner inverted cone, the port capable of accepting the secondary airstream.

6. The aircraft waste system of claim 2, wherein the third stage further comprises a check valve disposed below the at least one filter, the check valve configured to open in the absence of a differential pressure.

7. The aircraft waste system of claim 1, wherein each radial vane of the plurality of radial vanes is oriented at an angle of at most 45 degrees from vertical.

8. The aircraft waste system of claim 1, wherein each radial vane of the plurality of radial vanes is coated in a hydrophobic material.

9. The aircraft waste system of claim 1, wherein the exhaust port is disposed within an exhaust cap removably attached atop the housing.

10. The aircraft waste system of claim 1, wherein the integrated vortex separator is mounted to the waste tank in a non-vertical orientation.

11. The aircraft waste system of claim 1, wherein the plurality of radial vanes is a first plurality of radial vanes, further comprising:
a demister assembly in communication with the integrated vortex separator, the demister assembly comprising:
a) an outer chamber associated with a tertiary vortex flow, the outer chamber capable of receiving under suction the secondary airstream from the integrated vortex separator;
b) a second plurality of radial vanes extending inward from an inner surface of the outer chamber in a spaced apart relationship, the second plurality of radial vanes defining a second plurality of portals configured to generate the tertiary vortex flow by redirecting the secondary airstream;
and
c) an inner chamber disposed within the outer chamber, the inner chamber configured to receive the tertiary vortex flow via at least one port in communication with the outer chamber and including at least one filtering medium configured to generate a tertiary airstream by removing at least one third liquid component from the tertiary vortex flow;
and
an exhaust port in communication with the demister assembly, the exhaust port configured to remove the tertiary airstream from the demister assembly under suction.

12. The aircraft waste system of claim 11, further comprising:
a vent line in communication with the exhaust port, the vent line capable of removing the tertiary airstream from the aircraft under suction via an external outlet terminating the vent line, the suction induced by a differential pressure between a cabin pressure of the aircraft and an atmospheric pressure external to the aircraft when the aircraft is at or above a target altitude;
a vacuum generator in communication with the vent line, the vacuum generator configured to induce the suction by generating the differential pressure when the aircraft is beneath the target altitude;
and
at least one valve configured to selectably connect the waste tank to either of the vacuum generator or the external outlet.

13. The aircraft waste system of claim 11, wherein each radial vane of the second plurality of radial vanes is oriented at an angle of at most 45 degrees from vertical.

* * * * *